(12) United States Patent
Louboutin

(10) Patent No.: US 9,367,334 B2
(45) Date of Patent: Jun. 14, 2016

(54) VIBRATOR AND AUDIO RESOURCE SHARING FOR MOBILE COMMUNICATION DEVICE

(71) Applicant: ST-Ericsson SA, Plan-les-Ouates (CH)

(72) Inventor: Nicolas Louboutin, Le Mans (FR)

(73) Assignee: ST-Ericsson SA, Plan-les-Ouates (CH)

( * ) Notice: Subject to any disclaimer, the term of this patent is extended or adjusted under 35 U.S.C. 154(b) by 287 days.

(21) Appl. No.: 14/251,078

(22) Filed: Apr. 11, 2014

(65) Prior Publication Data

US 2014/0310726 A1      Oct. 16, 2014

(30) Foreign Application Priority Data

Apr. 12, 2013 (EP) ..................... 13305477

(51) Int. Cl.
  *G06F 13/00* (2006.01)
  *G06F 9/44* (2006.01)
  *G06F 9/52* (2006.01)

(52) U.S. Cl.
  CPC ............... *G06F 9/4411* (2013.01); *G06F 9/52* (2013.01)

(58) Field of Classification Search
  CPC .............................. G06F 9/4411; G06F 13/102
  USPC .......................... 719/321, 322, 327
  See application file for complete search history.

(56) References Cited

U.S. PATENT DOCUMENTS

| 5,671,442 A | 9/1997 | Feeney et al. |
| 7,007,075 B1 | 2/2006 | Coffey |
| 8,346,983 B2 * | 1/2013 | Lim ........................ G06F 3/023 719/321 |
| 2006/0050155 A1 * | 3/2006 | Ing .......................... G06F 3/005 348/231.99 |

FOREIGN PATENT DOCUMENTS

| EP | 0887730 A1 | 12/1998 |
| WO | 9825358 A2 | 6/1998 |

* cited by examiner

*Primary Examiner* — Andy Ho

(74) *Attorney, Agent, or Firm* — Coats & Bennett, P.L.L.C.

(57) ABSTRACT

A communication device includes at least two output apparatuses, and an interface circuit configured as an interface between the at least two output apparatuses and software drivers supported by an operating system embedded within the communication device, so that the software drivers can access the output apparatuses. The interface circuit includes an access control circuit configured to temporarily allocate a first one of the at least two apparatuses with a first one of the software drivers, so that other ones of the software drivers cannot access the first output apparatus during its allocation to the first software driver. The interface circuit also includes shared resource circuits configured to dynamically direct communication from the first software driver to the temporarily allocated first output apparatus.

15 Claims, 3 Drawing Sheets

VIBRATOR AND AUDIO RESOURCE SHARING FOR MOBILE COMMUNICATION DEVICE

RELATED APPLICATIONS

This application claims the benefit of European Application No. 13305477.5, filed 12 Apr. 2013, the disclosure of which is incorporated herein by reference in its entirety. This priority is claimed under the Paris Convention.

TECHNICAL FIELD

The present disclosure relates generally to the field of concurrent access to audio and vibrator resources in a mobile communication device.

BACKGROUND

Mobile communication devices, including smartphones, include usually audio outputs and vibrator outputs in order to output signals to the user. Applications of these signals include alerting the user of an incoming call or any other events, gaming or other applications, etc.

As depicted on FIG. 1, these outputting means comprise physical parts like a loudspeaker LS or a vibrator apparatus VB, and hardware circuits controlling the physical parts and preparing, coding, decoding and adapting the signals for them, like amplifiers Amp1, Amp2, multiplexers Mux1, Mux2, vibrator controllers VC1, VC2 or Digital-to-Analog Converter DAC. They are referred to as "Audio CODEC" (AC).

All these circuits constitutes resources that are made available to the applications running on the mobile communication devices through software drivers SD implemented within the kernel of the operating system embedded in the devices.

These drivers allow access to the audio and vibrator resources for the applications by providing standardized interfaces, or API (Application Programming Interfaces). The aim is that the applications can access to the resource thanks to known software functions without knowing about the actual underlying technology (type of amplifiers, loudspeaker or vibrator's furnisher or model, etc.), so that the same application can be run on different mobile communication devices without modification providing the operating system is the same (e.g., iOS, Android, Linux, Microsoft Windows, etc.).

Most of the operating systems (OS) allow several applications to be running concurrently or at least on time-sharing mode. This implies that the audio and vibrator resources may be requested by two or more applications.

To avoid that a same resource (the vibrator or a loudspeaker) is used by more than one application at a time, the system should properly handle concurrent accesses to the resource.

The state-of-the-art solutions consist in controlling the concurrent accesses at the software driver, like depicted in FIGS. 2a and 2b. Software drivers are provided at the layer of the OS (Operating System) kernel which sits between the hardware layer (that comprises the Codec AC and the vibrator VB and loudspeaker LS) and the user space wherein run the applications App1, App2 and services VS.

These solutions lie in having a single point of control, which is provided by the audio driver AD. The audio driver AD is in charge of any signals transmitted to or from the audio Codec AC (and therefore the resources LS, VB, with which it is associated).

FIG. 2a represents a first solution where a vibrator software driver VD is provided in addition to the audio software driver AD. An application App1, App2 willing to use the vibrator makes typically a call to a vibrator service VS provided within the user space (which can be embedded in the application itself, or available as plug-in or other independent modules). The vibrator service VS then makes a standardized call to the vibrator driver VD.

The vibrator driver VD should route the call to the audio driver AD in order to let it control the concurrent accesses to the hardware.

Such a solution requires a dependency between the vibrator driver VD and the audio driver AD. Such a dependency is not desirable as it makes it more complex to develop drivers and to maintain them: each new release has an impact to the other driver, which may be difficult to track properly especially if drivers come from different furnishers.

Moreover, dependency between drivers may even be forbidden with some operating system, e.g., Linux for instance.

The second solution depicted in FIG. 2b comprises only one software driver: the audio driver AD able to handle both types of output apparatuses, LS, VB. The vibrator service VS should then directly interwork with it. As it sits in all interactions between the services (vibrator service VS, but also audio service, not depicted), it can control the access and properly handle the concurrent accesses to a same hardware resource, LS, VB.

However, such a design requires the vibrator service VS to be adapted to interwork with the audio driver AD. It has thus impact in the user space and the solution needs to maintain a proprietary module inside this user space. It further prevents integrating easily a third party application, based on the vibrator driver.

Such a solution is therefore not desirable.

SUMMARY

An object of embodiments of the present disclosure is to alleviate at least partly the above mentioned drawbacks.

This is achieved with a communication device for a communication device comprising at least two output apparatuses and arrangement for interfacing said at least two output apparatuses with software drivers supported by the operating system embedded within said communication device, so that said software drivers can access said output apparatuses, wherein said arrangement comprises means to temporarily allocate one of said at least two apparatuses with one of said software driver, so that another software driver cannot access said one of said at least two output apparatuses during its allocation with said one of said software driver, and shared resources for dynamically directing communication from said software drivers to the temporarily allocated output apparatus.

According to embodiments of the present disclosure, said at least two output apparatuses may be of two different types of a group comprising at least a vibrator and a loudspeaker.

Said arrangement may comprise a set of indicators, each indicator being associated with a shared resource and adapted to take a value representative of the software driver with which it is temporarily allocated, and wherein said arrangement is adapted to temporarily allocate one of said at least two apparatuses with one of said software driver according to said set of indicators.

Said set of indicators may be a bit register wherein each bit is representative of one shared resource.

Said arrangement may alternatively comprise a set of indicators, said set of indicator being made of subsets indicators, wherein each subset is associated with a corresponding software driver and in each subset, each indicator being associated with a shared resource and adapted to take a value representative of whether said shared resource is allocated or not for said corresponding software driver, and wherein said arrangement is adapted to temporarily allocate one of said at least two apparatuses with one of said software driver according to said set of indicators.

Said set of indicators may be a bit register for each of said software driver, wherein each bit is representative of one shared resource.

Such a solution allows interfacing output apparatuses (vibrator, loudspeakers, etc.) with the software drivers embedded in the communication device, while keeping drivers independent to each other and without requiring adaptations of the software modules and applications running in the user space.

This is also achieved with an arrangement adapted to be embedded in a communication device comprising at least two output apparatuses and for interfacing said at least two output apparatuses with software drivers supported by the operating system embedded within said communication device, so that said software drivers can access said output apparatuses, wherein said arrangement comprises means to temporarily allocate one of said at least two apparatuses with one of said software driver, so that another software driver cannot access said one of said at least two output apparatuses during its allocation with said one of said software drivers, and shared resources for dynamically directing communication from said software drivers to the temporarily allocated output apparatus.

According to embodiments of the present disclosure, the arrangement may be adapted to interface with output apparatuses of two different types of a group comprising at least a vibrator and a loudspeaker.

This is further achieved with a method for interfacing at least two output apparatuses of a communication device with software drivers supported by the operating system embedded within said communication device, so that said software drivers can access said output apparatuses. One of the at least two apparatuses is temporarily allocated with one of said software driver, so that another software driver cannot access said one of said at least two output apparatuses during its allocation with said one of said software driver. Communication from said software drivers is dynamically directed to the temporarily allocated output apparatus through shared resources.

According to embodiments of the present disclosure, said at least two output apparatuses may be of two different types of a group comprising at least a vibrator and a loudspeaker.

The method may also include setting an indicator to a value representative of the software driver with which it is temporarily allocated, said indicator being associated with a shared resource, and temporarily allocating one of said at least two apparatuses with one of said software driver according to said set of indicators.

Said set of indicators may be a bit register wherein each bit is representative of one shared resource.

The method may further include setting an indicator to a value, said indicator being associated with a shared resource and part of a subset of indicators associated with a corresponding software driver and said value being representative of whether said shared resource is allocated or not for said corresponding software driver; and temporarily allocating one of said at least two apparatuses with one of said software driver according to said set of indicators.

Said set of indicators may be a bit register for each of said software driver, wherein each bit is representative of one shared resource.

This is also achieved with a computer program product comprising a computer readable medium, having thereon a computer program comprising program instructions, the computer program being loadable into a data-processing unit and adapted to cause execution of the method when the computer program is run by the data-processing unit.

Further features and advantages of embodiments of the present disclosure will appear from the following description of some embodiments of the disclosure, given as non-limiting examples, with reference to the accompanying drawings listed hereunder.

BRIEF DESCRIPTION OF THE DRAWINGS

The present disclosure will now be described more fully hereinafter with reference to the accompanying drawings, in which embodiments of the present disclosure are shown. However, the present disclosure should not be construed as limited to the embodiments set forth herein. Rather, these embodiments are provided so that this disclosure will be thorough and complete, and will fully convey the scope of the present disclosure to those skilled in the art. Like numbers refer to like elements throughout.

DETAILED DESCRIPTION

Figure 3:
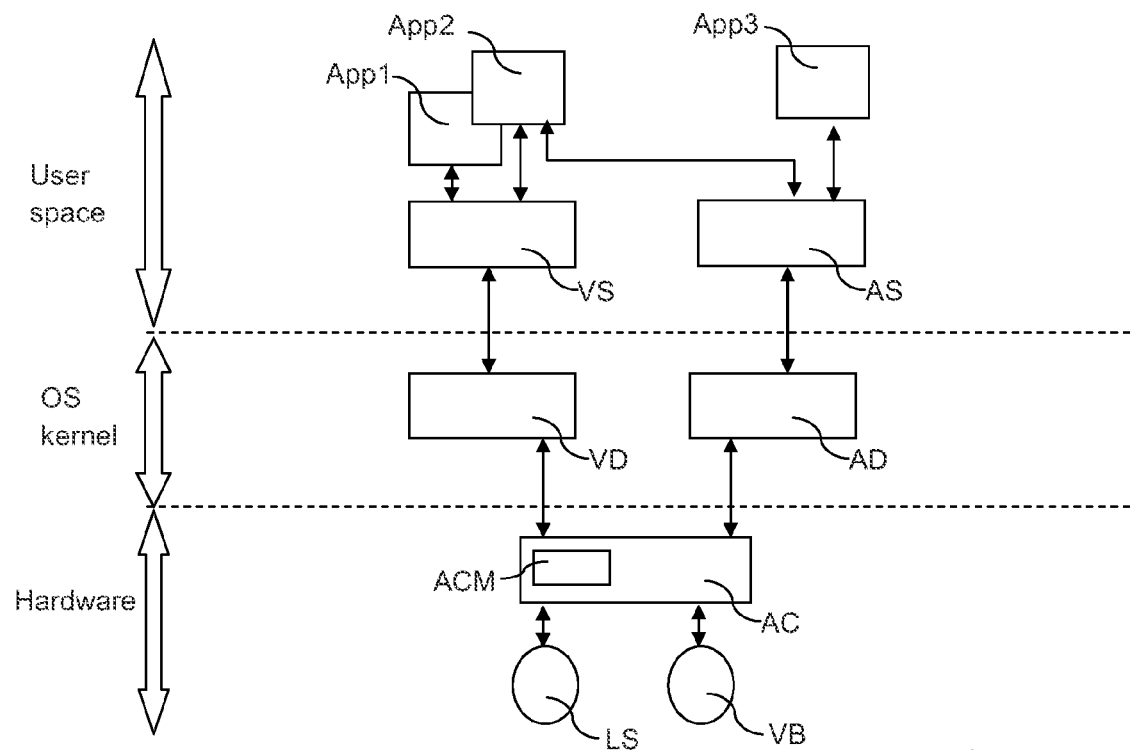
FIG. 3 a functional diagram in accordance with an embodiment.

FIG. 3 shows a high-level representation of a mobile communication device, like a smartphone. It comprises a hardware layer, an OS layer and a user space, where the applications and services are running.

The OS layer comprises a kernel with the basic OS platforms and drivers to control and pilot the hardware of the mobile communication device, and other (not depicted) software modules.

The hardware layer comprises the physical elements, like output apparatuses, and the circuitry (or CODEC) allowing the software drivers to access them.

Accessing means at least being able to transmit to them the signal appropriate for producing a physical signal directed at users, like audio sound produced by the loudspeaker or vibrations produced by vibrator VB.

Basically, the CODEC circuitry AC converts the digital signals coming from the software space through the drivers AD, VD, into analog signals directed to the output apparatuses.

In the example of FIG. 3, two apparatuses are depicted, each of a different type: one loudspeaker LS and one vibrator VB. It should be noted that more than two output apparatuses may be handled by the audio Codec circuitry AC. For instance, two loudspeakers may be provided in the mobile communication device so as to get stereo audio output. Other types of output apparatuses are also possible.

Figure 4:
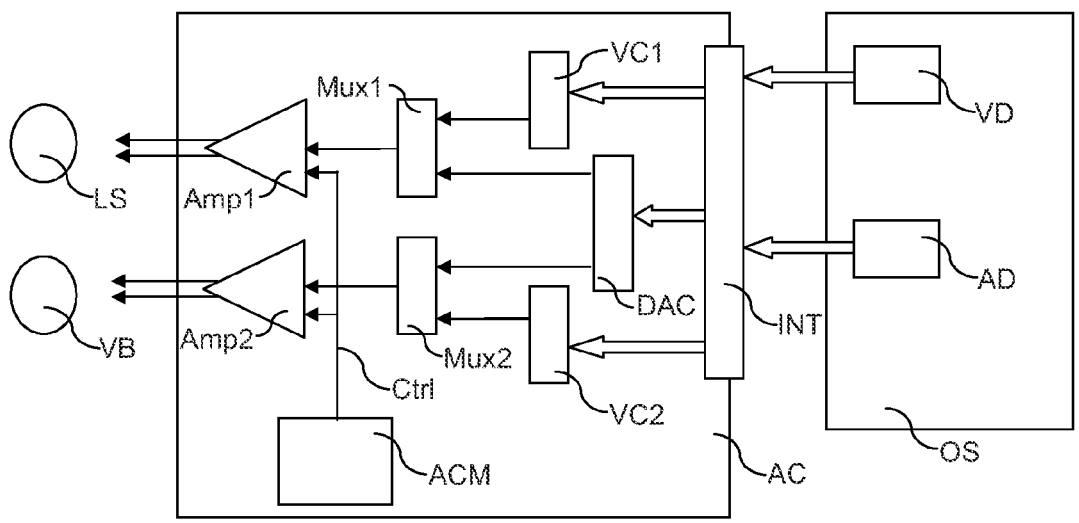
FIG. 4 shows an arrangement in accordance with an embodiment.

FIG. 4 depicts an audio Codec according to an embodiment.

It comprises an interface INT with the operating system, and more specifically with the audio and vibrator drivers supported by this operating system.

This interface may be standardized or not. In both cases, the drivers VD, AC are knowledgeable about the interface INT. Most of the time, the furnisher of the audio codec circuitry AC also provides the drivers adapted to interwork with it. The aim of the drivers VD, AC is to build the bridge between a furnisher-dependent space and furnisher and hardware-independent space (so called the "user space").

The audio Codec circuitry AC comprises means for preparing the signal received from the software layer to the hardware layer. More concretely, it usually includes the following:

A Digital-to-Analog Converter DAC, to convert the digital signal received from the audio driver AD into an analog form. This conversion can be performed according to the characteristics of the media renderer, i.e. the loudspeaker LS and quality characteristics which can be preset according to means out of the scope of the present disclosure (for instance in terms of bitrate, etc.).

Vibrator Controllers VC1, VC2 are provided to convert the digital signal received from the vibrator driver VD into signal intelligible for the vibrator apparatus VB.

Multiplexers Mux1, Mux2 are provided to route the signals outputted by vibrator controllers, respectively VC1, VC2, and digital-to-analog converter DAC to the amplifiers, respectively Amp1, Amp2.

Also amplifiers Amp1, Amp2 are provided to adapt the analog signal to the power level appropriate with the output apparatus LS, VB.

Typically two amplifiers Amp1, Amp2 may be provided, each being associated with a multiplexer, respectively Mux1, Mux2 and a vibrator controller, respectively VC1, VC2.

Figure 1:
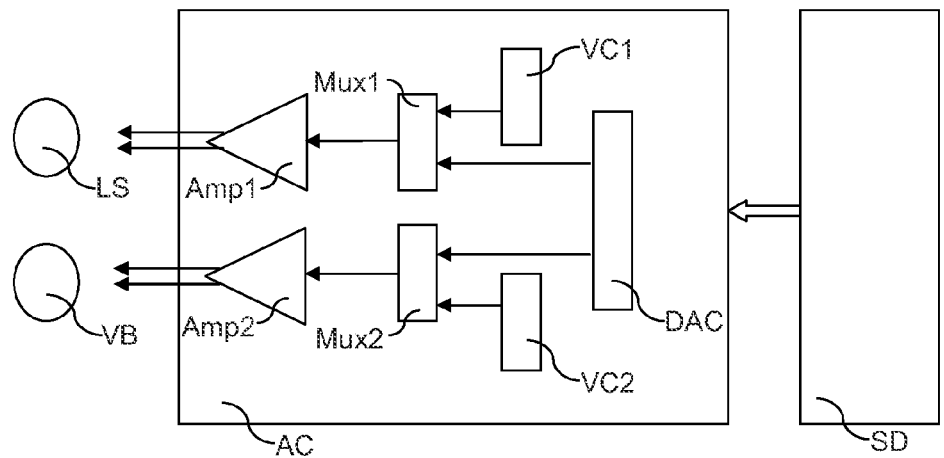
FIG. 1 shows a possible embodiment for a Codec circuitry according to prior arts.

Such architecture is pretty generic and may be embodied in several ways. It may be in accordance with solutions known in the art, as described previously in connection with FIG. 1. Details of implementation are therefore accessible to the man skills in art.

However, according to an aspect of the present disclosure, the output apparatuses are not statically linked to one of the amplifiers Amp1, Amp2.

Rather the amplifiers Amp1, Amp2, and the multiplexers Mux1, Mux2 constitutes shared resources, i.e. resource which can be used by any of the software drivers. Allocating a driver to a output apparatus involves allocating a shared resource Amp1, Amp2 to this software driver so that the communication from this software driver is dynamically directed towards the temporary allocated output apparatus.

Here, in the example depicted in FIG. 4, each amplifier can dynamically direct its output signal to one of the output apparatuses, i.e. the loudspeaker LS or the vibrator VB, according to a control command Ctrl provided by an access control module ACM. The control command Ctrl can act so that the output of the amplifiers Amp1, Amp2 corresponds to the allocated one among the possible inputs of the amplifiers.

This access control module ACM is provided inside the audio Codec circuitry AC. This module is not directed to the usual task of a Codec, i.e. to prepare the signal so that it can be understood by the output apparatuses. Rather, the access control module aims in controlling the access to the output apparatuses LS, VB by the software drivers VD, AD supported by the operating system OS.

For this purpose, the access control module ACM can temporarily allocate one output apparatus with one of the software driver. This allocation is a 1-1 allocation so that other software drivers cannot access the allocated output apparatus. In other words, it is a mutually exclusive allocation.

Some embodiments and examples will be described later, in connections with FIGS. 5 and 6.

Turning back to FIG. 3, three applications App1, App2, App3 are depicted. Each of them illustrates a different situation: the application App1 makes use of the vibrator service VS only; the application App2 makes use of both the vibrator service VS and the audio service AS; the application App3 makes use of the audio service AS only.

It should be understood that this situation is illustrative only. More applications can be deployed on a mobile communication device. Depending of the type of underlying operating system OS (iOS, Android . . . ), they can be running in parallel or not. A same application may makes use of a vibrator service VS and/or of an audio service AS at different time, especially depending on user settings or predetermined conditions.

As explained previously, the services VS, AS, can be embedded inside the application or provided as independent modules which can be access by applications. The relationships between applications and services and the possible software architecture will not be further explained as they are out of the scope of the present disclosure and part of the usual know-how of the person skilled in the art.

The services can communicate with the drivers thanks to software interfaces which may be standardized or at least well known to the software developers' community.

According to an aspect of the present disclosure, each type of service communicates with a corresponding type of software driver. This allows an optimal software architecture wherein the developer of a service and of an application should only know about the north interface of the appropriate software driver.

Figures 2A, 2B:
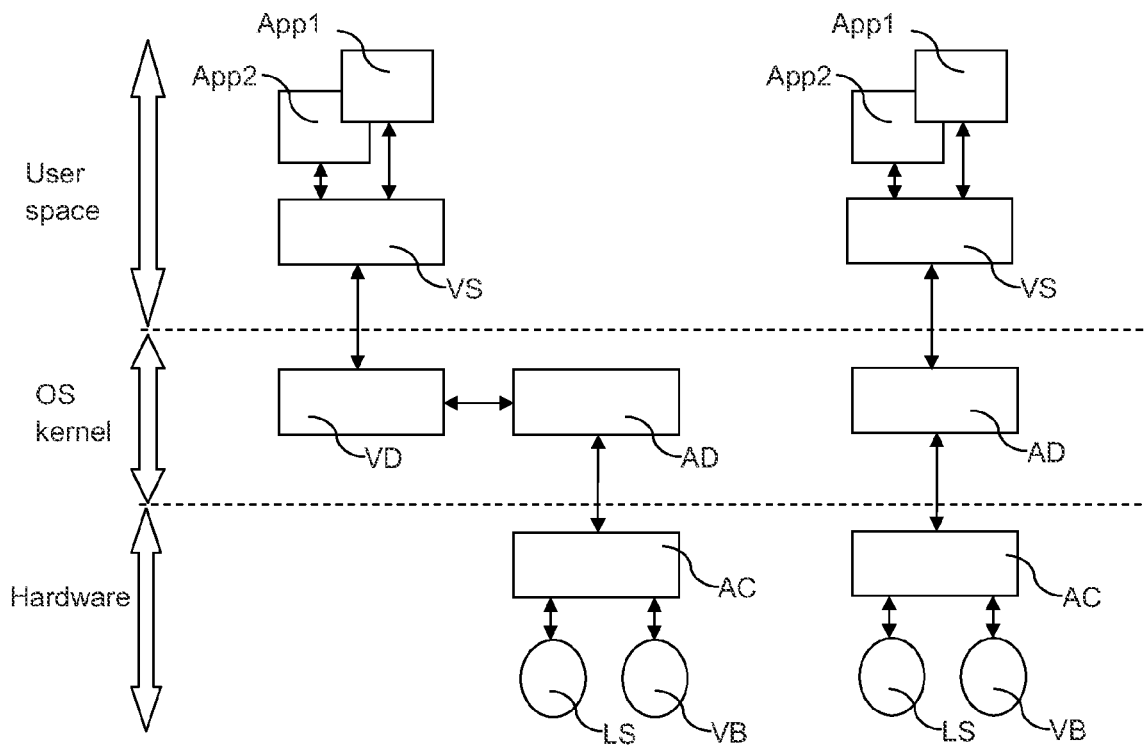
FIGS. 2a and 2b show a functional diagram illustrating two possible solutions of the state of the art.

By contrast with some prior art solutions like illustrated at FIG. 2b, the present disclosure provides the advantage that the service of a given type needs to be adapted only to the driver of the same type.

In the example of FIG. 4, the vibrator service VS communicates with the vibrator driver VD and the audio service AS communicates with the audio driver AD.

According to an aspect of the present disclosure, the software drivers AD, VD can communicate with a same arrangement, i.e. an audio codec AC, interfacing the output apparatuses LS, VB with the software drivers.

As previously described, FIG. 3 also depicts that the audio codec AC comprises the access control module ACM The access control module ACM comprises a set of indicators for memorizing the dynamic allocation of the output apparatuses LS, VB.

Several embodiments are possible.

According to a first embodiment, each indicator is associated with one shared resource. Its value can take a value representative of the software drivers AD, VD, with which it is temporarily allocated.

In addition, an assumption can be made that a default allocation is made between the shared resource (and therefore with the output apparatus) and one of the software driver AD, VD. According to a preferred embodiment, a default allocation is made between the audio driver AD and all the shared resource. This allows optimizing the allocation process that will be described later, and therefore reduces communications and processing inside the mobile communication device.

In the described example, the set of indicators can be a 2-bit register as follows:

The bit b1 is associated with the first shared resource, Amp1, and the bit b2 is associated with the second shared resource Amp2.

When the bit is set to 0, it means that the corresponding shared resource is allocated to the audio driver AD.

When the bit is set to 1, it means that the corresponding shared resource is allocated to the vibrator driver VD.

Such an embodiment is easily applicable only when only two software drivers are potentially willing to use the output apparatuses. It is however possible to adapt this solution to more than 2 drivers by encoding the allocated value in more than 1 bit.

Figure 5:
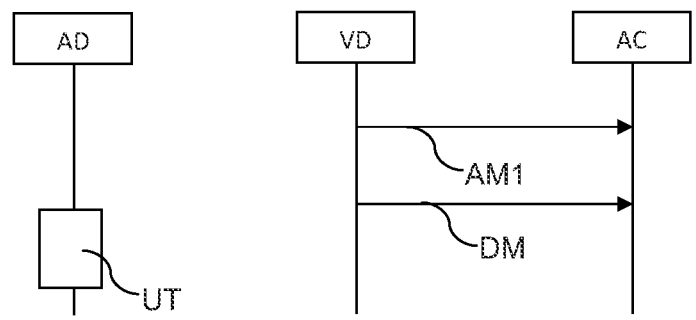
FIGS. 5 and 6 show flow charts of exemplary use cases, in accordance with two embodiments.

FIG. 5 depicts a flow chart for a possible use case associated with this first embodiment. This flow chart focuses only on the interactions between the software drivers and the arrangement (audio codec) AC. It does not depict the upstream interactions related to the applications and to the services VS, AS.

The vibrator driver VD sends an allocation message AM1 to the arrangement AC, indicating that it wants to allocate the second share resource.

The arrangement AC, and more particularly the access control module ACM, check the bit b2 corresponding to this second shared resource. It is here assumed that nothing happened previously so that b2=0. The allocation can then be done, and the bit b2 is modified so that b2=1.

The vibrator driver VD can therefore access to the vibrator VB by sending data message DM to the arrangement AC. The second shared resource is allocated to the vibrator driver VD so that the data are directed to the vibrator VB (and not to the audio loudspeaker).

Later, at the step UT, the audio driver AD tries to use a shared resource. Two possibilities: either it wants to allocate the first shared resource, Amp1, or it wants to allocate the second shared resource Amp2.

In the first case, the first shared resource Amp1 has not been allocated for another software driver and since the audio driver AD is the default allocated driver, there is no need for an explicit allocation and the audio driver can directly access the loudspeaker through the arrangement AC.

In the second case, the second shared resource Amp2 has already been allocated for the vibrator and for the vibrator driver VD, so that the audio driver AD cannot use it anymore. An error can be raised so that the audio driver may take the decision to postpone its request until the shared resource Amp2 is freed or to use the other (first) shared resource instead.

Figure 6:
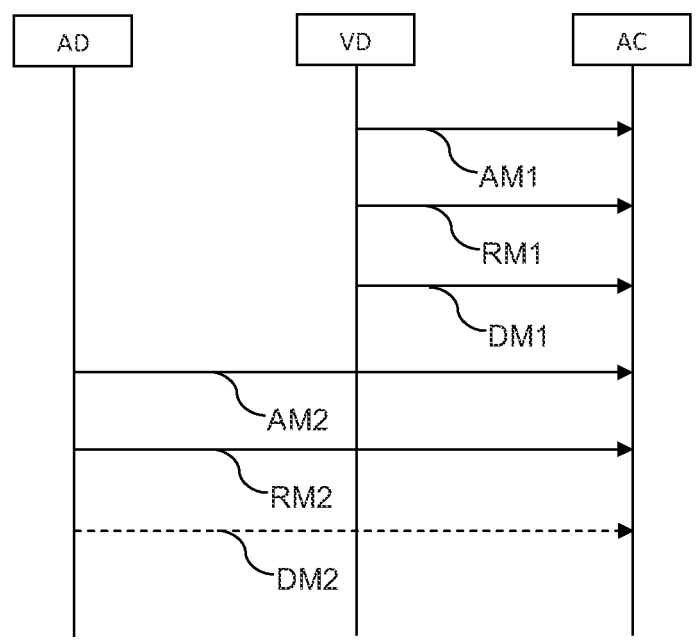

FIG. 6 illustrates a second embodiment.

According to this second embodiment, the set of indicator is made of subsets of indicators, wherein each subset is associated with a software driver AD, VD, which can potentially access the shared resources and the output apparatuses.

In each subset, each indicator is associated with one shared resource. Its value can take a value representative of whether the shared resource is allocated or not, for the corresponding software driver.

In the example of only 2 software drivers, AD, VD, the set of indicator can be a 2-bit register duplicated for each software driver, as follows:

The bits b1, b3 are associated with the first shared resource, Amp1, and the bits b2, b4 are associated with the second shared resource Amp2.

When the bit is set to 0, it means that the corresponding shared resource is not allocated.

When the bit is set to 1, it means that the corresponding shared resource is allocated to the corresponding software driver, i.e. the audio driver for b1 and b2 and the vibrator driver for b3 and b4.

Such an embodiment makes it possible to handle more than two software drivers.

The bits associated with a same shared resource but for different software drivers (for instance b2 and b4, or b1 and b3) are linked so that only one can be set to 1 at a given time. In other words, once one bit has been set to 1 (shared resource allocated), the other bits associated with this shared resource cannot be set to 1 anymore and can be put in a read-only mode.

This behavior can be managed by the access control module ACM which handle the set of indicators.

Several embodiments are then possible to implement the protocol regarding the interworking with the software drivers.

In one embodiment, the software driver should send an allocation message (to set the appropriate bit to 1) and later check whether the appropriate bit has actually been set to 1, by sending a reading command to the arrangement AC.

This protocol is made cleared in the example depicted by the flow chart of FIG. 6.

The vibrator driver VD sends an allocation message AM1 to the arrangement AC, indicating that it wants to allocate the second shared resource.

The arrangement AC, and more particularly the access control module ACM, tries to set to 1 the bit b4 corresponding to this second shared resource. It is here assumed that nothing happened previously so that b4=b2=0. The allocation can then be done, and the bit b4 is modified so that b4=1.

The vibrator driver VD then sends a reading message RM1 to check the value of this bit b4. This command returns b4=1 and accordingly the vibrator driver VD can then access the vibrator VB by sending data message DM1 to the arrangement AC. The second shared resource is allocated to the vibrator driver VD so that the data are directed to the vibrator VB (and not to the audio loudspeaker).

Later, the audio driver AD tries to use a shared resource. Two possibilities: either it wants to allocate the first shared resource, Amp1, or it wants to allocate the second shared resource, Amp2.

In both cases, it first sends an allocation message AM2 to the arrangement AC, indicating that it wants to allocate the first, respectively second, shared resource.

The arrangement AC, and more particularly the access control module ACM, tries to set to 1 the bit corresponding to this shared resource.

In the first case, it tries to set the bit b1 to 1. In this first case, the first shared resource Amp1 has not been allocated for another software driver, so that b3=0 also, and the bit b1 is writable (not in "read only mode"). The bit b1 is then actually set to 1.

In the second case, it tries to set the bit b2 to 1. However, the second shared resource Amp2 has already been allocated for another software driver, so that b4=1 as previously described.

Therefore, the bit b2 is in "read only mode". The allocation message AM2 will not manage to modify the value of the bit b2.

The vibrator driver VD then sends a reading message RM2 to check the value of this bit b1, respectively b2.

In the first case, this command returns b1=1 and accordingly the vibrator driver VD can then access the vibrator VB by sending data message DM2 to the arrangement AC. The first shared resource is allocated to the vibrator driver VD so that the data are directed to the audio loudspeaker.

In the second case, this command returns b2=0 and accordingly the vibrator driver VD cannot access the vibrator VB by sending data message DM2 to the arrangement AC. The vibrator drive VD shall then choose an alternate strategy.

The present disclosure has been described with reference to preferred embodiments. However, many variations are possible within the scope of the present disclosure.

What is claimed is:

1. A communication device comprising:
   at least two output apparatuses; and
   an interface circuit configured as an interface between the at least two output apparatuses and software drivers supported by an operating system embedded within the communication device, so that the software drivers can access the output apparatuses, wherein the interface circuit comprises:
      an access control circuit configured to temporarily allocate a first one of the at least two apparatuses to a first one of the software drivers, so that other ones of the software drivers cannot access the first output apparatus during its allocation to the first software driver; and
      shared resource circuits configured to dynamically direct communication from the first software driver to the temporarily allocated first output apparatus.

2. The communication device of claim 1, wherein the at least two output apparatuses comprise a vibrator and a loudspeaker.

3. The communication device of claim 1:
   wherein the interface circuit comprises a set of indicators, each indicator being associated with one of the shared resource circuits and being configured with a value representative of the software driver to which it is temporarily allocated; and
   wherein the interface circuit is configured to temporarily allocate one of the at least two apparatuses to one of the software drivers according to the set of indicators.

4. The communication device of claim 3, wherein the set of indicators includes a bit register, and wherein each bit of the bit register is representative of one of the shared resource circuits.

5. The communication device of claim 1:
   wherein the interface circuit comprises a set of indicators comprising subsets of indicators;
   wherein each subset of indicators is associated with a corresponding software driver, and in each subset, each indicator is associated with a respective one of the shared resource circuits and is configured with a value representative of whether or not its associated shared resource circuit is allocated to the corresponding software driver; and
   wherein the interface circuit is configured to temporarily allocate one of the at least two apparatuses to one of the software drivers according to the set of indicators.

6. The communication device of claim 5, wherein the set of indicators includes a bit register for each of the software drivers, and wherein each bit in a given bit register is representative of one of the shared resource circuits.

7. An interface circuit configured to be embedded in a communication device that comprises at least two output apparatuses, the interface circuit being configured as an interface between the at least two output apparatuses and software drivers supported by an operating system embedded within the communication device, so that the software drivers can access the output apparatuses, the interface circuit comprising:
   an access control circuit configured to temporarily allocate a first one of the at least two apparatuses to a first one of the software drivers, so that other ones of the software drivers cannot access the first output apparatus during its allocation to the first software driver; and
   shared resource circuits configured to dynamically direct communication from the first software driver to the temporarily allocated first output apparatus.

8. The interface circuit of claim 7, wherein the at least two output apparatuses comprise a vibrator and a loudspeaker.

9. A method for interfacing at least two output apparatuses of a communication device with software drivers supported by an operating system embedded within the communication device, so that the software drivers can access the output apparatuses, said method comprising
   temporarily allocating a first one of the at least two output apparatuses to a first one of the software drivers, so that other ones of the software drivers cannot access the first output apparatus during its allocation to the first software driver; and
   dynamically directing communication from the first software driver to the temporarily allocated first output apparatus through shared resource circuits.

10. The method of claim 9, wherein the at least two output apparatuses comprise a vibrator and a loudspeaker.

11. The method of claim 9, further comprising:
    setting an indicator within a set of indicators to a value indicative of the software driver to which it is temporarily allocated, wherein the indicator is associated with a shared resource circuit; and
    temporarily allocating one of the at least two apparatuses to one of the software drivers according to the set of indicators.

12. The method of claim 11, wherein the set of indicators includes a bit register, and wherein each bit of the bit register is representative of one of the shared resource circuits.

13. The method of claim 9, further comprising:
    setting an indicator within a set of indicators to a value, said indicator being associated with a shared resource circuit and being part of a subset of indicators associated with a corresponding software driver; the value being representative of whether or not the shared resource circuit is allocated to the corresponding software driver; and
    temporarily allocating one of the at least two apparatuses to one of the software drivers according to the set of indicators.

14. The method of claim 13, wherein the set of indicators includes a bit register for each of the software drivers, and wherein each bit in a given bit register is representative of one of the shared resource circuits.

15. A computer program product stored in a non-transitory computer-readable medium for interfacing at least two output apparatuses of a communication device with software drivers supported by an operating system embedded within the communication device so that the software drivers can access the output apparatuses, the computer program product comprising software instructions which, when executed by the communication device cause the communication device to:
- temporarily allocate a first one of the at least two output apparatuses to a first one of the software drivers, so that other ones of the software drivers cannot access the first output apparatus during its allocation to the first software driver; and
- dynamically direct communication from the first software driver to the temporarily allocated first output apparatus through shared resource circuits.

\* \* \* \* \*